Nov. 12, 1940.  N. B. MILLER  2,221,453
PACKING
Filed Feb. 23, 1939
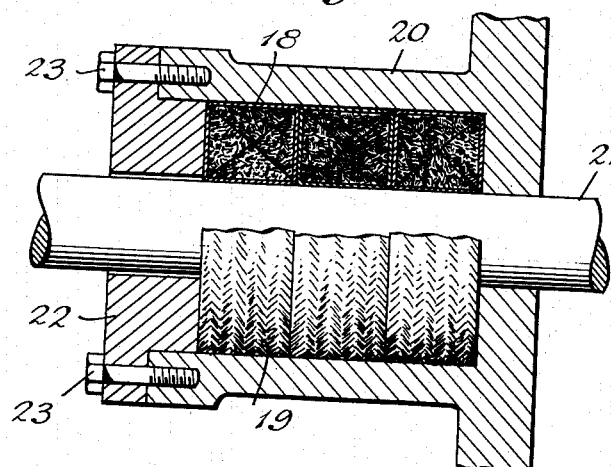
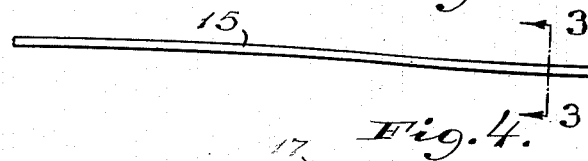
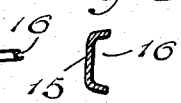
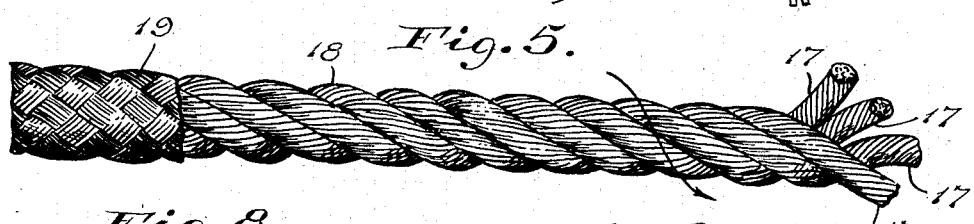
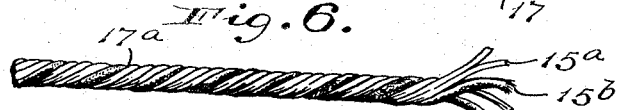
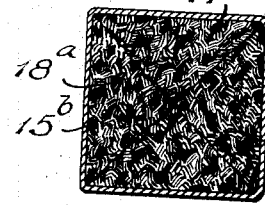
INVENTOR
NORMAN B. MILLER
BY
ATTORNEY Patented Nov. 12, 1940

2,221,453

UNITED STATES PATENT OFFICE 2,221,453

PACKING

Norman B. Miller, New York, N. Y., assignor to Harold Case, New York, N. Y., doing business as The Marlo Company Application February 23, 1939, Serial No. 257,809

1 Claim. (Cl. 57—139)

The invention relates to packings and more particularly to packings adapted for use in connection with piston rods, pistons, plungers, shafts and other moving mechanical elements. The object of the invention is to provide a packing of novel construction and maximum efficiency to effect a seal against fluid pressures developed in the mechanism with which said packing is combined, and possessing an inherent resilience whereby the interstices in the packing are automatically sealed to produce a homogeneous packing mass. Other more specific objects of the invention will appear in the description hereinafter and the features of novelty will be pointed out in the claim.

In the accompanying drawing, which illustrates an example of the invention without defining its limits, Fig. 1 is a sectional view of a conventional stuffing box showing the novel packing in use; Fig. 2 is a detailed view of a metallic strand used in the packing; Fig. 3 is a cross-section on an enlarged scale on the line 3—3 of Fig. 2; Fig. 4 is a detailed view of a cord consisting of a plurality of the metallic strands combined in a novel manner; Fig. 5 is a detailed view of a rope-like packing element comprising a plurality of cords combined in a novel manner; Fig. 6 is a view similar to Fig. 4 showing another form of cord; Fig. 7 is a view similar to Fig. 5 showing a rope-like packing element comprising a plurality of the cords illustrated in Fig. 6; Fig. 8 is an enlarged cross-section of the completed packing embodying the rope-like packing elements of Fig. 5; Fig. 9 is a fragmentary section, enlarged and exaggerated, of a portion of the rope-like packing element shown in Fig. 5, and Fig. 10 is a view similar to Fig. 8 of the completed packing embodying the rope-like packing elements of Fig. 7.

The novel packing shown in Figs. 2 to 5 inclusive, comprises strands 15 made of a suitable metal or metal alloy having a channelled form in cross-section for instance as illustrated in Fig. 3, the channels 16 being in the nature of grooves extending lengthwise of said strands 15 preferably from end to end thereof. A plurality of the channelled strands 15 in predetermined numbers are twisted together preferably in long twists in a given direction, for instance clockwise, to form cords 17 such as illustrated in Fig. 4. Several of the cords 17, depending in number upon the dimensions of the finished product, are then twisted together preferably in the opposite direction, for instance counterclockwise, to form rope-like packing elements 18 such as shown in Fig. 5. As the above steps in the production of the packing take place, the channels 16 cause the strands 15 to bite into or interlock with each other and to become nested together as indicated in Fig. 9 to form a compact mass of maximum flexibility in every direction.

To improve the construction and particularly to facilitate handling, the rope-like packing elements 18 may be enclosed in a protective covering 19 of any suitable material such as cotton, flax, asbestos or the like; the covering 19 may be applied to the elements 18 in any convenient manner as for instance by being braided thereon.

In the preferred form, a lubricant such as oil and wax, or other suitable material, may be added to the rope-like packing elements 18 in any convenient manner, after the protective covering 19 has been applied thereto. In some forms of the novel packing the lubricant may be otherwise applied than above stated, while in other forms the addition of lubricant to the packing elements 18 may be omitted.

The cross-section of the packing elements 18 with or without the protective covering 19 thereon may be of approximately circular form, or said elements 18 may be calendered between pressure rolls or otherwise subjected to pressure to press said elements into substantially rectangular or equivalent or other suitable shape in cross-section as exemplified in Fig. 8.

In practice the packing consisting of the rope-like packing elements 18 either with or without the protective covering 19 as the case may be, are placed within the stuffing box 20 so as to surround the plunger, piston rod or equivalent element 21 extending axially through said stuffing box 20; the packing is closely confined within the latter by means of a gland 22 and bolts 23 in the customary manner as shown in Fig. 1. It will be understood that this method of utilizing the novel packing in a conventional stuffing box is not in any sense intended to define the range of utility of said packing.

The cord 17a shown in Fig. 6 consists of a combination of channelled strands 15a of suitable metal alloy, and strands 15b of inorganic or organic fibers such as asbestos, flax, and the like. The channelled strands 15a and the fiber strands 15b together are twisted in one direction as previously described with respect to Fig. 4 and also preferably in long twists to produce the cords 17a. A number of the cords 17a are then twisted together preferably in the opposite direction to form rope like-like packing elements 18a. As the aforesaid operative steps to produce the packing take place, the channelled strands 15a will be interlocked with or bite into each other and become nested together as in the form first described; at the same time the fiber strands 15b will be located throughout the cord 17a and extend spirally thereof between the convolutions of the channelled strands 15a, the whole forming a compact homogeneous packing mass also of maximum flexibility in every direction.

In this last mentioned form, the packing elements 18a may be enclosed in protective coverings 19a of cotton, linen, asbestos or any other suitable material; as in the form first described the coverings 19a may be applied to the packing elements 18a in any convenient manner as by being braided thereon.

In the form of packing under discussion and shown in Figs. 6, 7 and 10, a lubricant such as oil and wax or other suitable material may be added to the packing elements 18a before the protective covering 19a has been applied thereto; a second application of such lubricant may be added to said packing elements 18a after the protective covering 19a has been applied. In some instance where an unlubricated packing is required, one or other applications of the aforesaid lubricant may be omitted.

The packing elements 18a may have an approximately circular form in cross-section or as previously set forth in connection with the packing first described herein, said packing elements 18a either with or without the protective covering 19a thereon, may be calendered between pressure rolls or otherwise subjected to pressure to press said elements into substantially rectangular or equivalent or other suitable shape in cross-section as illustrated in Fig. 10.

In the packing consisting of the combination of the metallic channelled strands 15a and fiber strands 15b, the latter provide resilience in the packing elements and form cushions between metallic strands 15a; furthermore, the fiber strands 15b seal the interstices in the packing to provide a homogeneous packing mass of maximum efficiency. The combination metallic and fiber packing provides an efficient seal against fluid pressure such as gaseous, steam and other similar working pressures developed in the machine in which the packing is incorporated. The last mentioned form of packing may be used in a stuffing box as illustrated in Fig. 1 and as previously described herein, although this also is not to be interpreted as defining the range of utility of said packing.

In all of its forms the novel packing provides a compact packing mass of maximum flexibility, in which any section will yield in every direction under the application of pressure for instance by the gland of a stuffing box. Perfect and compact filling of any stuffing box regardless of type is assured with the novel packing, and correspondingly efficient results are obtained regardless of the type of use to which said packing is put. The novel packing is economical to produce and requires no particular skill in its installation in stuffing boxes or other arrangements.

In some forms the packing may comprise a plurality of metallic strands and a plurality of fibre strands twisted together to form cords, and a plurality of said cords twisted together to constitute packing elements.

Various changes in the specific forms shown and described may be made within the scope of the claim without departing from the spirit of the invention.

I claim:

A cord for use in the production of packings of the kind described and consisting of a plurality of channelled metallic strands having open grooves extending lengthwise thereof, said strands being twisted together in relatively long twists with some of said strands nesting in the open grooves of adjacent strands and the longitudinal edge portions of other strands extending into the open grooves of contiguous strands in interlocking engagement therewith.

NORMAN B. MILLER.